United States Patent [19]

Sano

[11] Patent Number: 5,690,292
[45] Date of Patent: Nov. 25, 1997

[54] TAPE CARTRIDGE AND METHOD FOR MANFACTURING SAME

[75] Inventor: Koichi Sano, Sagamihara, Japan

[73] Assignee: Imation Corp., Oakdale, Minn.

[21] Appl. No.: 672,151

[22] Filed: Jun. 27, 1996

[30] Foreign Application Priority Data

Jun. 28, 1995 [JP] Japan .................................. 7-161833

[51] Int. Cl.[6] .................................................. G11B 23/087
[52] U.S. Cl. .................. 242/340; 242/342; 242/352.4; 242/346.2; 226/190
[58] Field of Search ............................. 242/340, 342, 242/345, 345.2, 346, 346.2, 352.4; 226/190, 194; 360/130.21, 132

[56] References Cited

U.S. PATENT DOCUMENTS

| | | |
|---|---|---|
| 3,692,255 | 9/1972 | von Behren . |
| 3,907,234 | 9/1975 | Sato et al. .................................. 226/190 |
| 5,204,796 | 4/1993 | Koizumi et al. .......................... 242/342 |
| 5,362,009 | 11/1994 | Howard, Jr. et al. .................... 242/342 |

*Primary Examiner*—John P. Darling
*Attorney, Agent, or Firm*—Charles L. Dennis, II

[57] ABSTRACT

A tape cartridge with minimal tape tension variation and a method of making the same. The tape cartridge includes a supply-side tape reel around which a tape is wound and a winding-side tape reel both rotatably mounted to a base. At least one pin having a first end is attached to the base. At least one roller having a through-hole is rotatably engaged with the pin. Grease is interposed between the at least one pin and the through-hole. A second end of the pin includes a recess opening in an axial direction of the pin. The recess has a volume greater than a volume of excess grease accumulated on an end portion of the pin during mounting the roller on the pin. The roller may be an idler or drive roller for a belt-driven tape cartridge or a tape reel.

16 Claims, 6 Drawing Sheets

SPEED = 90 ips
SIDE LOAD = 32 OZ.
ERROR BAR = ± 1 SIGMA (n=6)

- -□- - CONVENTIONAL DATA CARTRIDGE
—△— EMBODIMENT

TAPE CARTRIDGE AND METHOD FOR MANFACTURING SAME

FIELD OF THE INVENTION

The present invention relates to a tape cartridge with minimal tape tension variation and a method of making the same.

BACKGROUND OF THE INVENTION

As an external recording apparatus of a computer, a data cartridge of belt-driven type proposed by Robert A. Von Behren (refer to U.S. Pat. No. 3,692,255, Japanese Laid-Open Patent Publication No. 48-15517) is known. It is to be noted that a tape cartridge in which a magnetic tape is used is referred to as a data cartridge. Similarly to a tape cassette generally used as a sound recording medium, the data cartridge has a pair of tape reels 2 and 3 and a pair of idler rollers 4 and 5 accommodated in a thin casing 1, as shown in FIG. 8. Different from the sound recording tape cassette, the data cartridge further comprises a driving roller 6 and a driving belt 7. The tape reels 2 and 3 are discs which are rotatably provided in approximately the center in the casing 1 in a longitudinal direction thereof and around which a tape 10 is wound. The tape 10 wound around the tape reel 2 is fed to the tape reel 3 via a predetermined tape path and wound around the tape reel 3. On the other hand, there is a case in which the tape 10 is transported from the tape reel 3 to the tape reel 2. The idler rollers 4 and 5 are discs having the rotational center thereof on a second center line parallel with a first center line passing through the rotational center of each of the tape reels 2 and 3 and positioned in proximity to each of the corners of the casing 1, positioned in the direction opposite to the tape path-provided direction with respect to the first center line. The driving roller 6 is located on the tape path-provided side such that it is located at a position intermediate between the tape reels 2 and 3.

In the data cartridge having the above-described construction, the elastic driving belt 7 engages the driving roller 6 and the idler rollers 4 and 5 in such a manner that the driving belt 7 is pressed against the peripheral surface 2a of the tape reel 2 or the peripheral surface 3a of the tape reel 3 opposed to the tape reel 2 or against the surface of the tape wound around the tape reels 2 and 3. Thus, in the state shown in FIG. 8, the driving belt 7 is transported from the driving roller 6, the surface 2a of the tape 10 wound around the tape reel 2, the idler roller 4, the idler roller 5, and the surface 3a of the tape reel 3, thus returning to the driving roller 6. The driving roller 6 is pressed against a motor drive pack 8 provided on an apparatus on which the data cartridge is mounted and rotated by the rotation of the motor drive pack 8. Thus, the tape reels 2 and 3 are rotated owing to the movement of the driving belt 7 caused by the pressing of the driving belt 7 against the surface 2a of the tape reel 2 and the surface 3a of the tape reel 3. As a result, the driving the tape 10 is moved.

The track of the tape 10 is located between the tape reels 2 and 3 and extended along one end of the data cartridge in the longitudinal direction thereof across a cut-out portion 1a in which a transducer such as a reading/writing magnetic head 9 which is a portion of a driving mechanism of the apparatus on which the data cartridge is installed make an access to the tape 10.

The data cartridge of the belt-driven type is required to maintain the specification that the tape 10 is transported by the driving belt 7 at a force under a maximum driving force and at the same time, satisfy the specification that a tension not less than a minimum value is applied to the tape 10. That is, it is necessary to control friction forces of parts of the data cartridge. This is because the following problems occur if the tape tension is excessively high or low. That is, if the tape tension is excessively low, the contact pressure between the magnetic head 9 and the magnetic tape 10 drops because it is difficult to keep the contact (generally called "head touch") uniformly. Consequently, when the data cartridge is used, there are disadvantages such as the deterioration of a reproduced output and the increase in an error of a reproduced signal. If the tape tension is low, the edges of the tapes 10 wound around the tape reel 2 or the tape reel 3 are irregular, i.e., the tape 10 is not wound favorably. If, on the other hand, the tape tension is excessively high, the pressure in the contact between the magnetic head 9 and the magnetic tape 10 becomes excessively high, with the result that the durability of the magnetic head 9 and/or that of the magnetic tape 10 become deteriorated.

Therefore, as a method for causing the magnetic tape 10 to generate a predetermined tension, conventionally, grease is applied to the contact portion between the driving roller 6 and a pivot pin 13 thereof, the contact portion between the tape reel 2 as well as the tape reel 3 and the pivot pin thereof or the contact portion between the idler roller 4 as well as the idler roller 5 and the pivot pin 12 thereof.

As a method for applying grease to each of the above-described contact portions, the following three methods are considered. That is, referring to FIG. 9, (1) after a roller 15, for example, corresponding to the idler rollers 4 and 5 is mounted on a pivot pin 14 corresponding to the above-described pivot pins, grease is injected to a contact portion 16; (2) after grease is applied to the peripheral surface 14a of the pivot pin 14, the roller 15 is installed on the pivot pin 14; or (3) after grease is applied to the inner peripheral surface 15a of a receiving hole, of the roller 15, through which the pivot pin 14 is penetrated, the roller 15 is installed on the pivot pin 14. It is easy to form a lubricating layer, made of grease, having a uniform thickness in the clearance between the inner peripheral surface 15a of the receiving hole of the roller 15 and the peripheral surface 14a of the pivot pin 14 and prevent excess grease from being flowed out to a base surface 17 in mounting the roller 15 on the pivot pin 14. Thus, the method (3) is generally adopted.

Since grease fills the clearance between the inner peripheral surface 15a of the receiving hole of the roller 15 and the peripheral surface 14a of the pivot pin 14 sufficiently, excess grease is applied to the inner peripheral surface 15a. As a result, the excess grease is extruded from the contact portion between the inner peripheral surface 15a of the receiving hole of the roller 15 and the peripheral surface 14a of the pivot pin 14. This phenomenon occurs in the method (3) as well. As shown in FIG. 9, the excess grease 18 which has been extruded from the above-described portion is present on an end surface 14b of the pivot pin 14.

Grease is a mixture of mineral oil or synthetic oil called base oil, having a low viscosity, which is a main component thereof; and a solid component consisting of metallic soap or gelling agent called thickening agent and additive selected depending on use. The viscosity of fresh grease is hundreds to ten thousand poises. In the grease, the base oil is separated from the solid component with the elapse of time and, in particular, in an environment having a high temperature.

Normally, the temperature at which the data cartridge is preserved and used is in a range of 5°–45° C. When the data cartridge is installed inside a drive for driving the data cartridge, in some cases, the data cartridge is used at a temperature as high as 70° C. In particular, when the data cartridge is placed in an environment having a high temperature, the separation of the base oil from the solid component is accelerated. Needless to say, in the excess grease 18 which has been extruded from the above-described portion, the base oil is separated from the solid component. The separated base oil moves as shown by arrows 19 of FIG. 9 and is mixed with grease 21 present in the clearance 20 between the inner peripheral surface 15a of the roller 15 and the peripheral surface 14a of the pivot pin 14.

Since the idler rollers 4 and 5 are engaged by the driving belt 7 in the data cartridge, the degree of the rotational torque of the idler rollers 4 and 5 affects the tension of the magnetic tape 10 greatly. Accordingly, the viscosity of the grease present in the clearance between the idler roller 4 as well as the idler roller 5 and the pivot pin 12, namely, the viscosity of the grease present in a portion corresponding to the clearance 20 affects the tension of the magnetic tape 10 most effectively. As described above, the excess grease 18 is present as well on the upper end portion (portion corresponding to the above-described end surface 14b) of the pivot pin 12 of each of the idler rollers 4 and 5. Thus, the base oil is separated from the excess grease 18 present on the pivot pin 12 as well, with the result that the separated base oil encroaches into the clearance 20 between the idler roller 4 as well as the idler roller 5 and the pivot pin 12. The base oil has a comparatively low viscosity, for example, about 1 to about 200 centipoise. Therefore, as a result of the encroachment of the base oil into the clearance 20, the viscosity of the grease 21 present in the clearance 20 drops, and thus the rotational torque of the idler rollers 4 and 5 drops. Consequently, the tension of the magnetic tape 10 becomes low, which causes the occurrence of the above-described problem. The provision of the process of wiping the excess grease present on the pivot pin increases manual labor or necessitates the provision of a precision machine, thus causing manufacturing cost to be high and hence, is unfavorable.

SUMMARY OF THE INVENTION

The present invention relates to a tape cartridge with minimal tape tension variation and a method of making the same. The present invention is also directed to a system for rotatably mounting a roller to a base of a tape cartridge.

A tape cartridge having a supply-side tape reel around which a tape is wound and a winding-side tape reel are both rotatably mounted to a base. At least one pin is attached to the base at a first end. At least one roller having a through-hole is rotatably engaged with the pin. Grease is interposed between the pin and the through-hole. The pin has a recess formed proximate a second end, opening in an axial direction of the pin. The recess has a volume greater than a volume of excess grease that accumulates on an end portion of the pin during mounting of the roller on the pin. p In one embodiment, the tape cartridge further includes a drive roller for driving the supply-side tape reel and the winding-side tape reel while a driving belt travels in contact with the tape. The roller is preferably a pair of idler rollers for the drive belt.

The volume of the recess is at least one microliter. In one embodiment, the recess is an inclined surface extending from a peripheral surface at the second end of the pin. The recess has a shape selected from a group consisting of conical, hemispherical, cylindrical, pyramidal, hexagonal, and prism-shaped. The second end of the pin preferably projects through the roller. The grease has about 50 to 90 percent by weight base oil.

In mounting the roller on the pin by applying grease to the through-hole of the roller, there is a possibility that excess grease which has been extruded from the through-hole of the roller remains on the other end of the pin. The recess accommodates the excess grease. Since the recess has a volume greater than that of the excess grease, the recess has a function of preventing the excess grease from being mixed with the grease present between the through-hole of the roller and the pin. That is, the recess has a function of preventing base oil separated from the excess grease from being moved to the clearance between the pin and through-hole. Thus, the possibility that the base oil is mixed with the grease present between the through-hole and the pin is minimized, and hence, the viscosity of the grease present between the through-hole and the pin should remain the same. Accordingly, the recess has the operation of preventing the tension of a magnetic tape from being reduced and allowing the magnetic tape to keep an appropriate tension.

The present invention is also directed to a belt-driven tape cartridge containing first and second rollers having through-holes rotatably engaged with pins mounted to a base. The pins each have a recess, opening in an axial direction of the pins. Grease is interposed between the pin and the through-hole. A drive belt spans a driving roller, the supply-side tape reel, the first roller, the second roller, and the winding-side tape reel sequentially, such that the driving belt passes on a surface of the supply-side tape reel and a surface of the winding-side tape reel, opposed to the surface of the supply side tape reel. The recesses preferably have a volume greater than a volume of excess grease that accumulates on an end portion of the pins during mounting of the rollers.

The present invention is also directed to a system for rotatably mounting a roller to a base of a tape cartridge. The roller may be an idler roller or drive roller for a belt-driven tape cartridge or a tape reel.

The present invention is also directed to a method for manufacturing the tape cartridge of the present invention. A tape cartridge base having at least one pin is provided. The pin has a first end mounted to the base and a second end. A recess is formed in the second end of the pin that opens in an axial direction of the pin. Grease is applied either to an inner peripheral surface of the through-hole of the roller or to the pin. The pin is inserted into the through-hole of the roller to which the grease has been applied, such that the recess has a volume greater than a volume of excess grease accumulated on an end portion of the pin during mounting a roller.

DETAILED DESCRIPTION OF THE PREFERRED EMBODIMENT(S)

Figure 1:
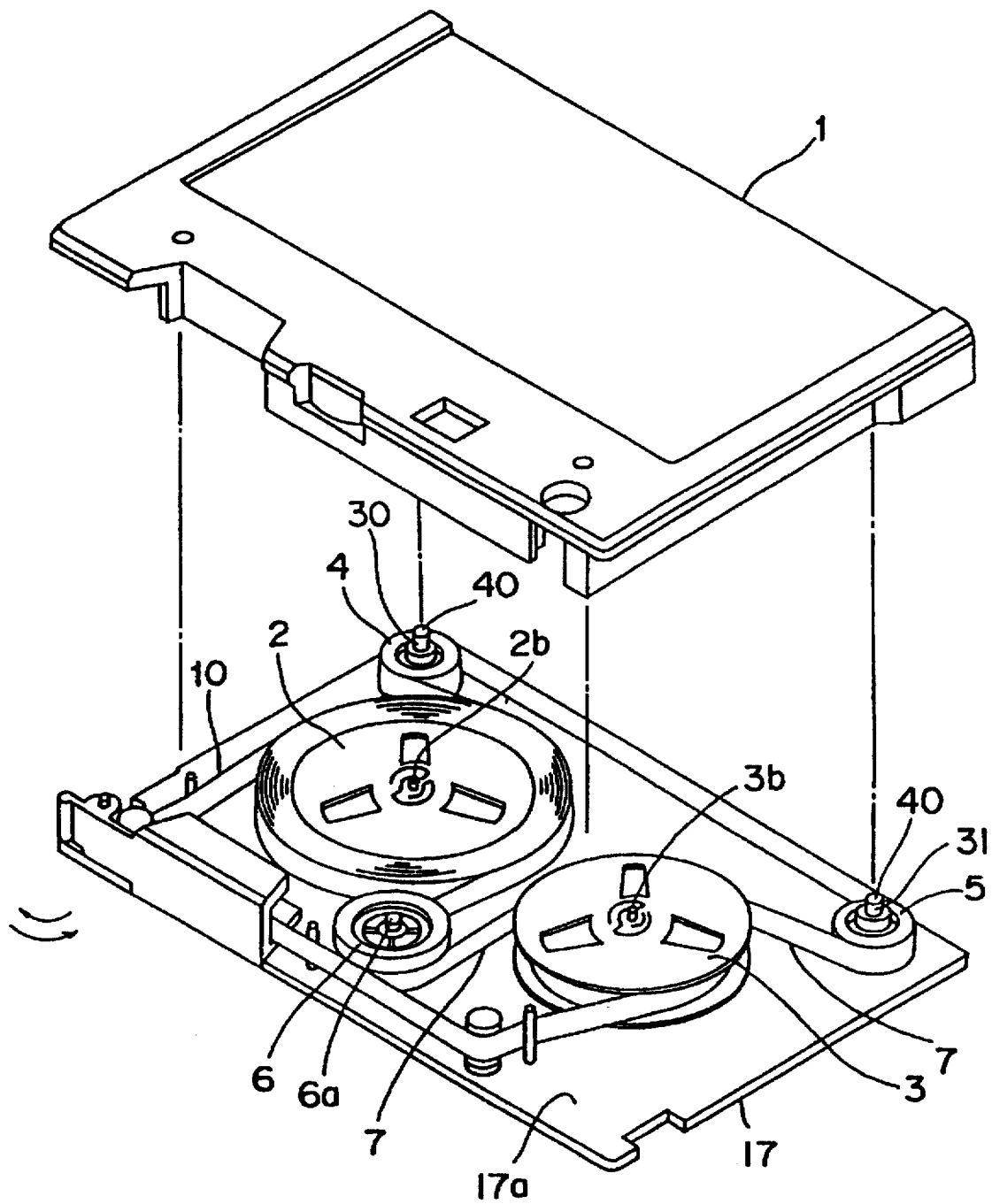
FIG. 1 is a perspective view showing the construction of a tape cartridge according to an embodiment of the present invention.

The tape cartridge according to the present invention includes a recess for accomodating excess grease is formed on one of a roller pin. The recess accommodates the excess grease which has been accumulated on the end of the pin and is unnecessary for the lubrication of the pin and the roller. Thus, even though the base oil is separated from the excess grease, the recess stores the base oil. The recess prevents the base oil from being transferred to the clearance between the roller and the pin and the rotational torque of the roller from being dropped. Therefore, the tension of the magnetic tape can be prevented from being lowered.

Referring now to the accompanied drawings, the embodiments of the present invention will be described in detail below. It is to be noted that parts having the same construction are designated by the same reference numerals. It will be understood that the present invention is not limited to the belt-driven tape cartridge disclosed herein. In the present embodiment, a recess which will be described later is formed on a pivot pin of each idler roller provided in the data cartridge of belt-driven type, but may be provided on pivot pins of other rollers in addition to that of each idler roller.

Figure 8:
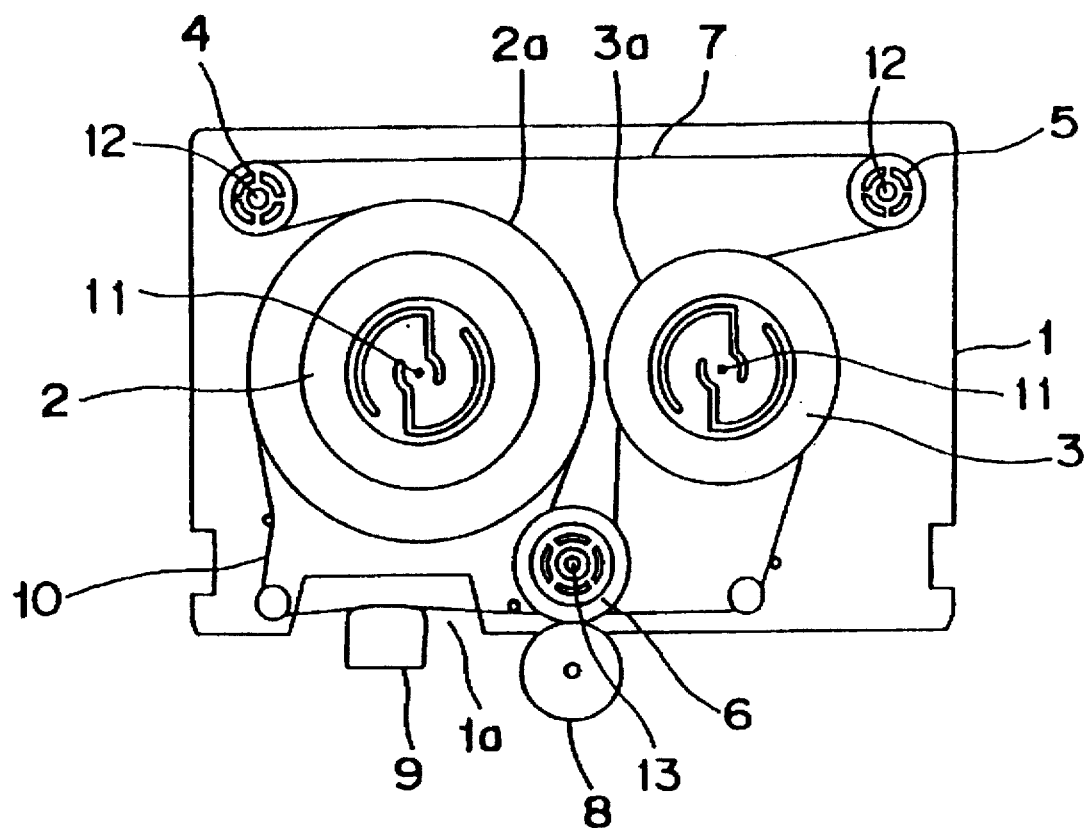
FIG. 8 is a top view showing the construction of a conventional tape cartridge.
Figure 9:
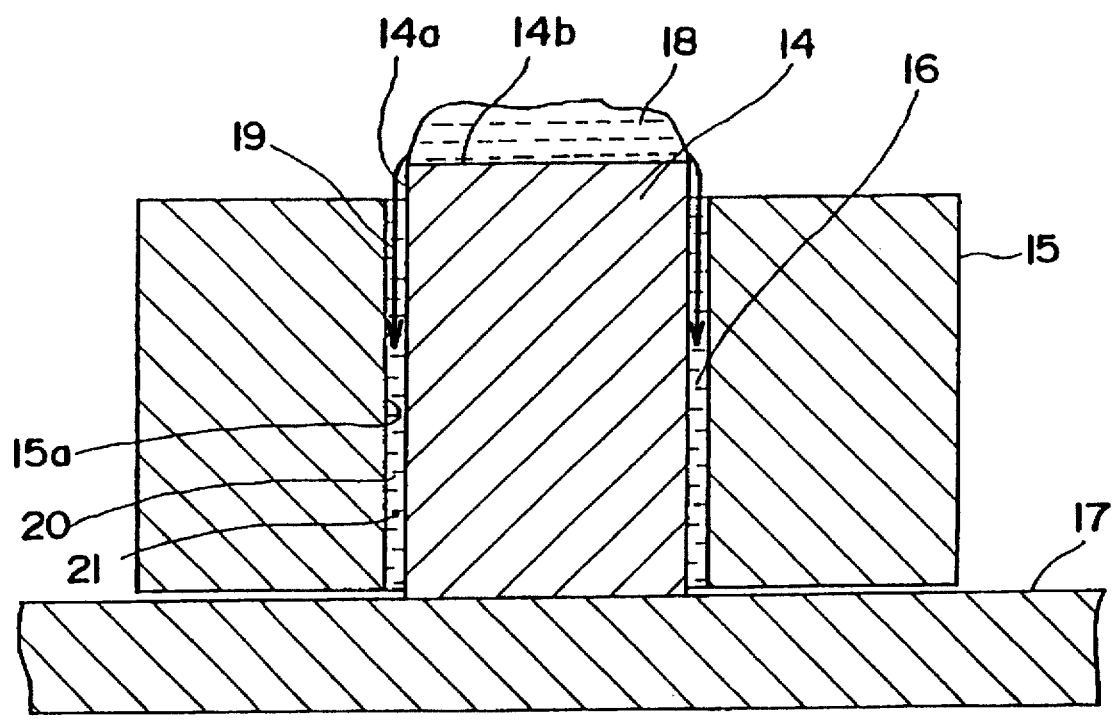
FIG. 9 is a sectional view showing an idler roller and a pivot pin thereof of a tape cartridge shown in FIG. 8.

As will be described in detail later, except that a recess is formed at an end of the various pivot pins, the data cartridge of belt-driven type according to this embodiment has the same construction as that of the data cartridge described previously with reference to FIG. 8. Thus, except the description of main parts of the data cartridge and that relating to the recess 40, the descriptions of other constituent parts are omitted herein. The specifications of the main parts of the data cartridge according to this embodiment are described below.

The material of a base 17 is alloy containing metal such as aluminum, magnesium, zinc and the like or plastic such as polyolefin, polyamide, ABS resin and the like. When the base 17 is made of the above-described alloy, the material of pivot pins 2b and 3b of each of tape reels 2 and 3, that of pivot pins 30 and 31 of each of the idler rollers 4 and 5, and that of a pivot pin 6a of a driving roller 6 (the tape reels, the idler rollers and the driving roller and the like are generically termed "rollers") are metal such as stainless steel. When the base 17 is made of the above-described plastic, the pivot pins 30, 31, 2b, 3b and 6a and the base 17 can be integrally formed by molding such as injection molding. Accordingly, it is preferable to use plastic as the material of the base 17 in that the recess 40 can be easily formed on the pivot pins 30, 31, 2b, 3b and 6a.

The height of each of the pivot pins 30, 31, 2b, 3b and 6a is normally in a range of 5–30 mm with respect to the upper surface 17a of the base 17, and preferably, in a range of 8–15 mm. If the height of each of the pivot pins 30, 31, 2b, 3b and 6a is too small, it is necessary that the height of each of the rollers 4, 5, 2, 3 and 6 to be mounted on the pivot pins 30, 31, 2b, 3b and 6a is small. In particular, if the height of the pivot pins 30 and 31 is small, it is necessary that the height of the idler rollers 4 and 5 is small and, hence, it is also necessary to reduce the width of the driving belt 7 to be engaged at the idler rollers 4 and 5. This reduces the strength of the driving belt 7, thus causing the driving belt 7 to be broken easily, and making it difficult to apply a predetermined tension thereto. On the other hand, if the height of each of the pivot pins 30, 31, 2b, 3b and 6a is too great, the thickness of the data cartridge itself is great and hence, the miniaturization of the data cartridge cannot be achieved. The pivot pins 30, 31, 2b, 3b and 6a are columnar or cylindrical and the diameter thereof is normally in a range of 2–10 mm.

Plastics such as polyacetal, polypropylene, and Teflon™ and the like are preferable as the material of the rollers 4, 5, 2, 3 and 6, because the plastics make the weight of the entire data cartridge light. The outer diameter of the rollers 4, 5, 2, 3 and 6 is normally 5–50 mm, and the inner diameter of a through-hole, of each of the rollers 4, 5, 2, 3 and 6, into which each of the pivot pins 30, 31, 2b, 3b and 6a is inserted is so set that the clearance between the peripheral surface of each of the pivot pins 30, 31, 2b, 3b and 6a and the inner peripheral surface of each of the through-holes is in a range of 0.01–1 mm. This is because if the clearance is too small, the rotational torque of each of the rollers 4, 5, 2, 3 and 6 becomes too high, whereas if the clearance is too large, the rotational torque of each of the rollers 4, 5, 2, 3 and 6 becomes non-uniform. The length of each of the through-holes is normally 5–30 mm so that the end of each of the pivot pins 30, 31, 2b, 3b, and 6a projects from the rollers 4, 5, 2, 3 and 6, respectively, when the rollers 4, 5, 2, 3 and 6 are installed on the pivot pins 30, 31, 2b, 3b and 6a, respectively.

Grease is applied to the above-described clearance in order to adjust the friction between the roller 4, 5, 2, 3 and 6 and the pivot pin 30, 31, 2b, 3b and 6a, respectively, similarly to the conventional art. The grease is semisolid lubricating agent, containing base oil and thickening agent, in which the base oil is gelled by the thickening agent. Grease preferably used in the data cartridge contains synthetic oil of hydrocarbon group as the base oil; lithium soap as the thickening agent; oxidation stabilizing agent, metal deactivator, and solid lubricating agent as additive. Favorably, the grease has the following composition. That is, the base oil: 50–90 percent by weight, the thickening agent: 5–30 percent by weight, and the additive: 1–20 percent by weight. More favorably, the grease has the following composition. That is, the base oil: 75–85 percent by weight, the thickening agent: 5–15 percent by weight, and the additive: 10–15 percent by weight.

The use of synthetic oil of hydrocarbon group as the base oil in combination with the lithium soap as the thickening agent is preferable because the base oil is prevented from being separated easily from the solid component. The reason it is favorable to contain the base oil in the grease at 50–90 percent by weight with respect to the entire weight thereof is as follows: If the amount of the base oil is contained therein at less than 50 percent by weight, the reduction degree of the viscosity of the grease is outstanding when the grease is mixed with the base oil and thus the grease does not last long term use, whereas if the amount of the base oil is contained therein at more than 90 percent by weight, the base oil in the grease is apt to be separated from the solid component. Favorably, the viscosity of the grease is 100–10,000 poises in a measurement at a shear rate per 1 sec$^{-1}$ and more favorably, 3,000–6,000 poises at the same shear rate.

The data cartridge used in this embodiment has a construction as shown in FIG. 1 and is manufactured by Minnesota Mining and Manufacturing Company of St. Paul, Minn. (hereinafter denoted as "3M"). The size of the data cartridge is 5.25 inches and the product number thereof is "DC6525". In the data cartridge of "DC6525," a tape length is 310.9 m, and a tape thickness is 9.6 μm. In the data cartridge of "DC6525," the pivot pins 30 and 31 are made of stainless steel, the height thereof is 8.0 mm, and the diameter thereof is 4.0 mm. The material of the idler rollers 4 and 5 is polyacetal resin, the length of the through-hole of each of the idler rollers 4 and 5 is 7.8 mm, and the inner diameter of the through-hole is 4.8 mm.

The grease used contains synthetic oil of hydrocarbon group as the base oil and lithium soap as the thickening agent. The consistency of the grease is 300–330 ((measuring method: JIS (Japanese Industrial Standard) K2220 5.3)); the dropping point thereof is 202° C. (measuring method: JIS K2220 5.4); and the viscosity thereof is 4490 poises (shear rate per 1 sec$^{-1}$). The viscosity was measured by a Rheometer manufactured by Rheometorix Company.

Figure 2:
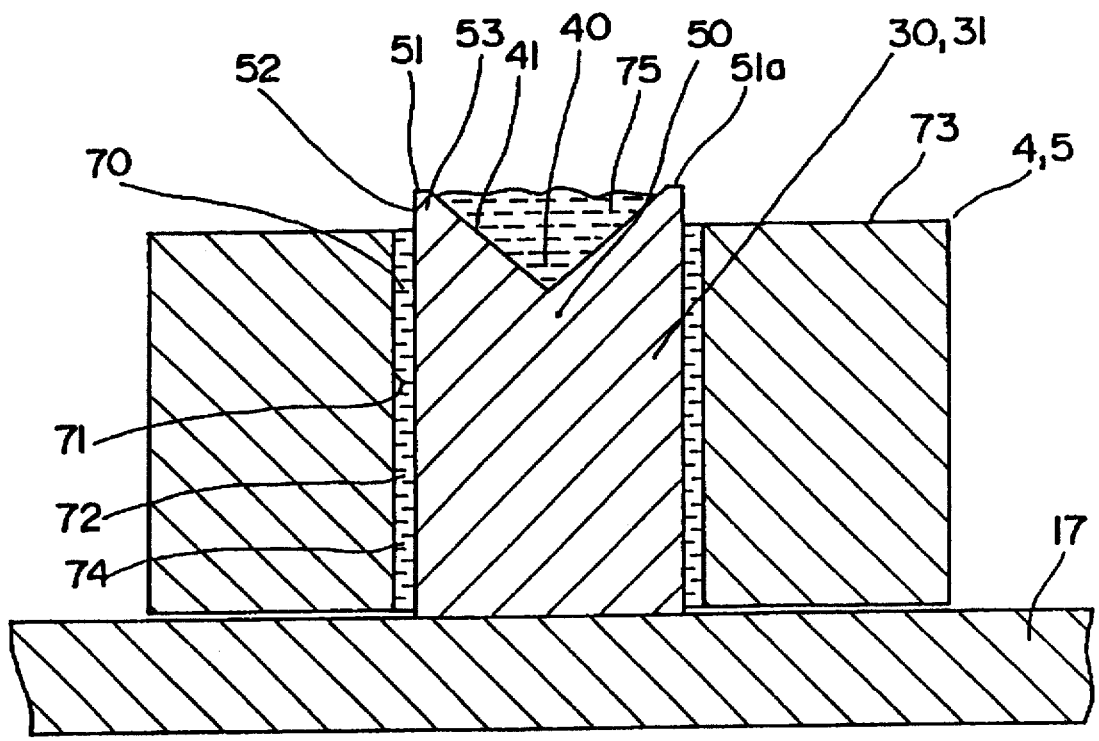
FIG. 2 is a sectional view showing an idler roller and a pivot pin thereof.

The pivot pins 30 and 31 are described below in detail with reference to FIG. 2. The pivot pins 30 and 31 have the above-described configuration and size and erected by fixing one end thereof to the base 17. A recess 40 which opens in the extension direction of an axis of each of the pivot pins 30 and 31 is formed on an end surface 51 of the other end portion 50 thereof. As shown in FIG. 2, the recess 40 is conical and has, on the end surface 51, an inclined surface 41 which inclines from a portion 53 proximate to a peripheral surface 52 of each of the pivot pins 30 and 31 to the axis of each of the pivot pins 30 and 31.

Figure 3:
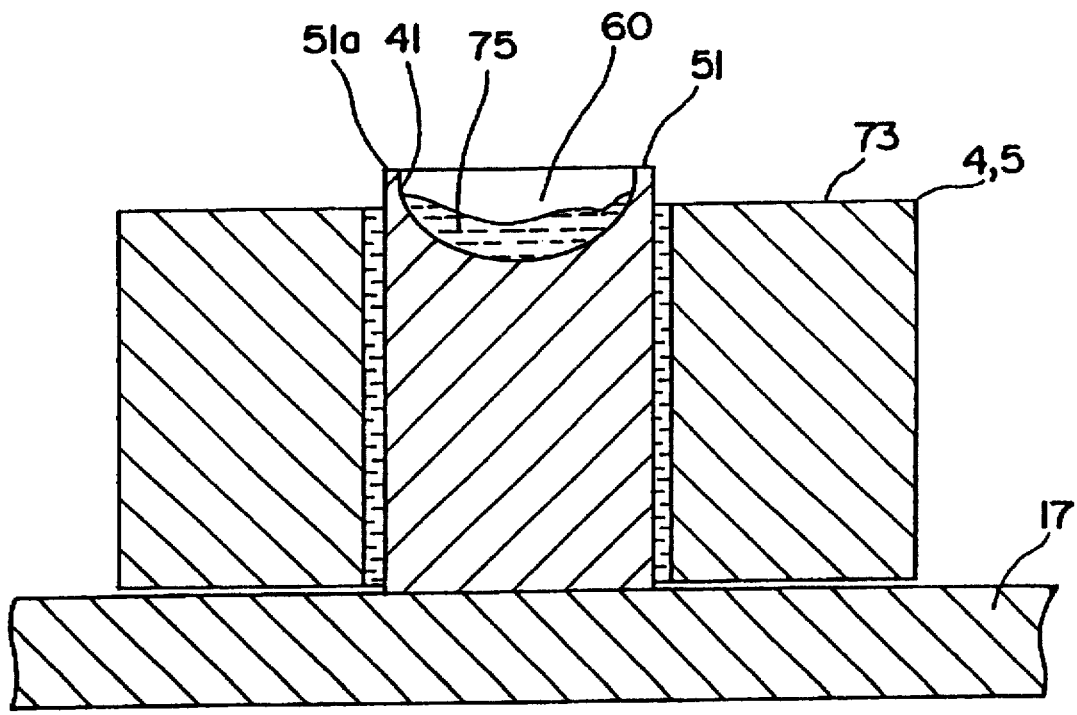
FIG. 3 is a sectional view of an alternate idler roller and a pivot pin thereof.
Figure 4:
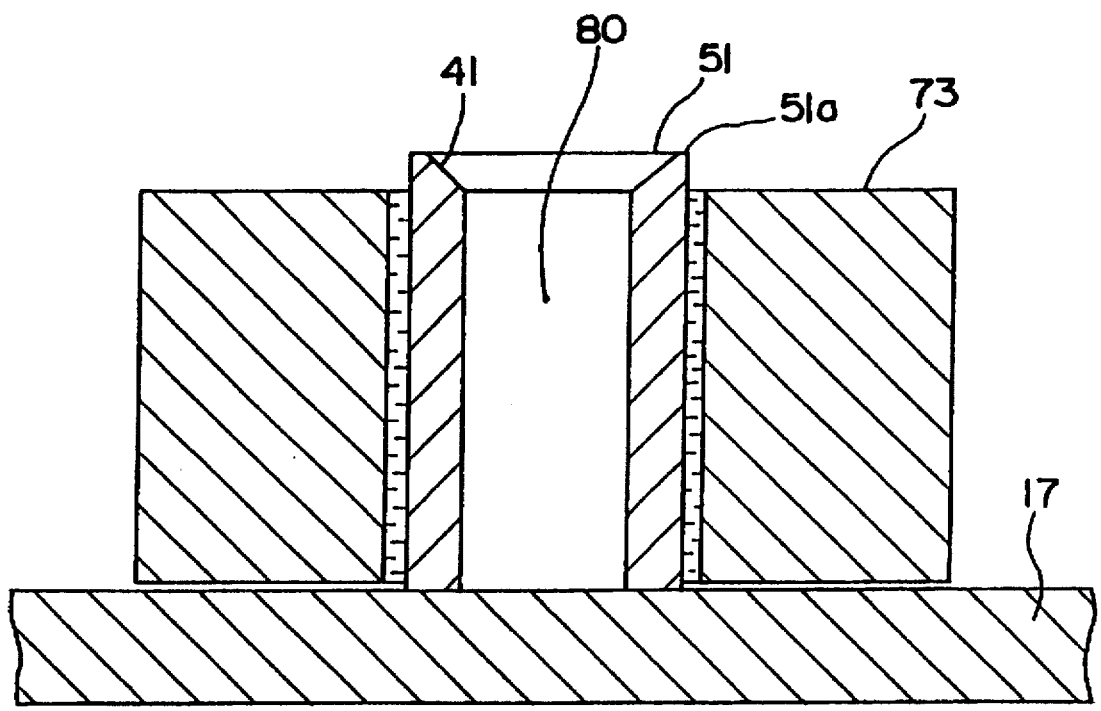
FIG. 4 is a sectional view of an alternate idler roller and a pivot pin thereof.

Further, as another configuration of the recess, the recess may be a hemispheric recess 60 formed by recessing the end surface 51, as shown in FIG. 3. Further, as still another configuration of the recess, the recess may be a hollow recess 80 extending along the axis of the pivot pins 30 and 31 from the end surface 51 to the base 17 as shown in FIG. 4.

As described above, after grease is applied to the inner peripheral surface 71 of the through-hole 70 of each of the idler rollers 4 and 5, the idler rollers 4 and 5 are installed on the pivot pins 30 and 31, respectively by inserting the pivot pins 30 and 31 into the through-hole 70 of each of the idler rollers 4 and 5. At that time, excess grease which has been extruded from a clearance 72 between the inner peripheral surface 71 of the through-hole 70 of each of the rollers 4 and 5 and the peripheral surface 52 of each of the pivot pins 30 and 31 is accumulated on the end surface 51 of each of the pivot pins 30 and 31. The recesses 40, 60, and 80 accommodate excess grease 75 on the end surface 51 and prevent the excess grease 75 from mixing with the grease present in the clearance 72. Each of the recesses 40, 60, and 80 has a volume to accommodate a sufficient amount of the excess grease 75. A favorable volume of each of the recesses 40, 60, and 80 is 10$^{-6}$ liters (microliters) or more. This volume is based on a typical value of the amount of the excess grease known experimentally in the data cartridge. In the recess having a volume smaller than the above-described value, there is a possibility that the grease is not received by the recess due to the influence of the viscosity of the grease and the surface tension or the like. More favorably, the above-described volume is 3×10$^{-6}$ liters or more.

In order to prevent the excess grease 75 from being present on the end surface 51 as much as possible, namely, in order to reduce the area of a flat region 51a of the end surface 51, the inclined surface 41 of each of the recesses 40, 60, and 80 is formed inward on the end surface 51 from a position thereof closest possible to the peripheral surface 52 of each of the pivot pins 30 and 31. If the inclined surface 41 cannot be formed on the recess 80 due to problems in manufacture accompanied by the formation thereof, it is unnecessary to provide the inclined surface 41 in the recess 80.

Figure 5:
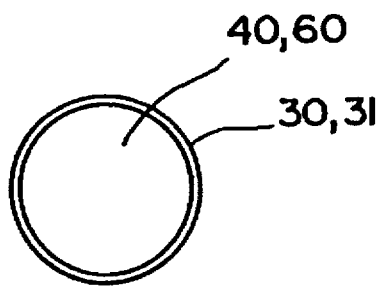
FIG. 5 is a plan view of the recesses shown in FIGS. 2 and 3.
Figure 6:
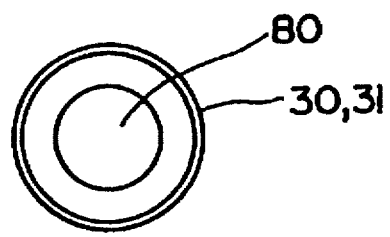
FIG. 6 is a plan view of the recess shown in FIG. 4.

The recesses 40, 60, and 80 can be formed by means of a drilling machine generally used. In consideration of the strength of the pivot pins 30 and 31, the recesses 40 and 60 are more favorable than the recess 80. Preferably, the plan configurations of the recesses 40, 60, and 80 are circular, as shown in FIGS. 5 and 6 so as to accommodate the excess grease 75 therein easily, even though the viscosity of the excess grease 75 is comparatively high.

The recesses 40, 60, and 80 are conical, hemispheric, and cylindrical, respectively, but may be, for example, pyramidal or hexagonal prism-shaped.

In the data cartridge according to this embodiment, the recess 40 shown in FIG. 2 is adopted as the recess. The volume of the recess 40 is 8×10$^{-6}$ liters (eight microliters). The recess 40 is formed on both pivot pins 30 and 31. The amount of grease to be applied to each of the through-holes 70 of the idler rollers 4 and 5 is about 2–3 mg (about 2–3 microliters).

The projection amount of each of the pivot pins 30 and 31 which project from an upper surface 73 of each of the idler rollers 4 and 5 is favorably in a range of 0.01–5 mm and more favorably, in a range of 0.1–3 mm. This is because if the projection amount is too small or if the other end portion 50 of each of the pivot pins 30 and 31 is recessed from the upper surface 73 of each of the idler rollers 4 and 5, it becomes difficult to separate the excess grease 75 from effective grease 74 which is present in the clearance 72 and effective for adjusting the torque of the idler rollers 4 and 5. On the other hand, if the projection amount is too large, the influence of the grease present on the peripheral surface 52 of each of the pivot pins 30 and 31 projecting from the upper surface 73 as well as the influence of the excess grease 75 present on the end surface 51 of the idler rollers 4 and 5 to be given to the reduction in the rotational torque of the idler rollers 4 and 5 cannot be ignored.

The operation to be performed in the data cartridge constructed as described above when the idler rollers 4 and 5 are installed on the pivot pins 30 and 31, respectively is described below. Similarly to the conventional art, the tape reels 2, 3 and the driving roller 6 are mounted on the pivot pins 2b, 3b and 6a, respectively other than the pivot pins 30 and 31 on which any of the recesses disclosed herein are formed.

As described above, when the idler rollers 4 and 5 are installed on the pivot pins 30 and 31, respectively, the excess grease 75 unnecessary for lubricating the idler rollers 4 and 5 which has been extruded from the clearance 72 between the inner peripheral surface 71 of the through-hole 70 of each of the idler rollers 4 and 5 and the peripheral surface 52 of each of the pivot pins 30 and 31 is accumulated on the end surface 51 of each of the pivot pins 30 and 31. But the width of the flat portion 51a of the end surface 51 of each of the pivot pins 30 and 31 is small. Thus, when the data cartridge is located at a horizontal position such that each of the recesses is opened upward in the axial direction of the pivot pins 30 and 31, the excess grease 75 is accommodated in the recess 40. That is, the excess grease 75 can be easily accommodated in the recess 40 when the idler rollers 4 and 5 are installed on the pivot pins 30 and 31, respectively, with the data cartridge located at a horizontal position or the data cartridge is preserved or used, with the data cartridge located at a horizontal position.

Thus, even if the base oil is separated from the excess grease 75 with the elapse of time, the separated base oil remains in the recess 40 and does not move along the peripheral surface 52 and not mix with the effective grease 74 which is present in the clearance 72. Thus, the viscosity of the grease 74 does not drop because the separated base oil does not mix with the effective grease 74. Therefore, the change in the rotational torque of the idler rollers 4 and 5 hardly occurs with the elapse of time. Because the data cartridge allows the tension to be uniformly applied to the magnetic tape 10 irrespective of the elapse of time, data can be read out correctly irrespective of the elapse of time.

Further, the above-described effect of the recess 40 can be also obtained even in the case where the data cartridge is preserved or used by locating it at a position other than a horizontal position. The reason is as follows:

Because the connection between the excess grease 75 and the effective grease 74 is cut off, the base oil separated from the excess grease 75 does not mix with the effective grease 74 substantially or the mixing takes place very slowly, even in the case where the data cartridge is located at a position other than the horizontal position.

Figure 7:
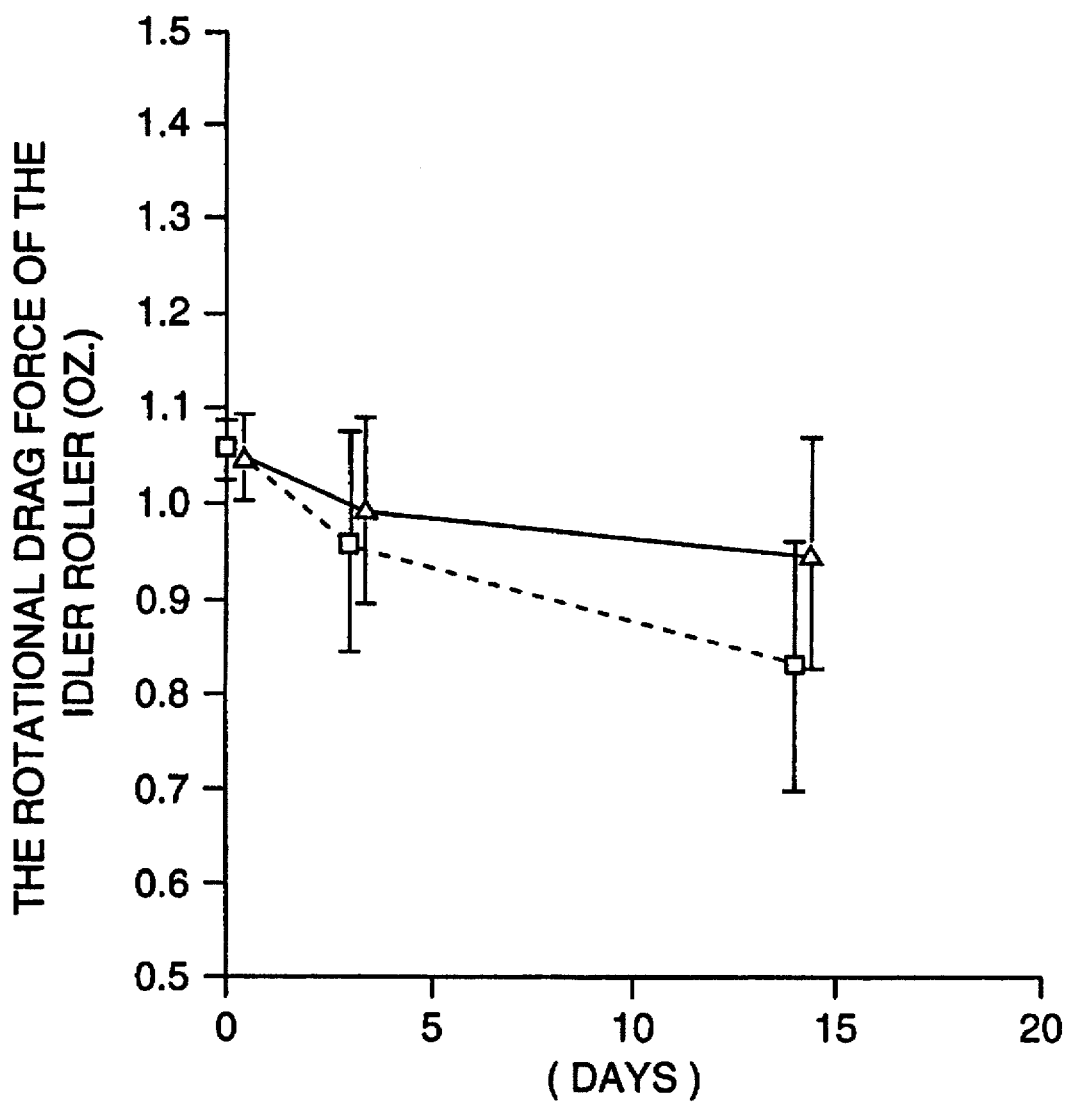
FIG. 7 is a graph showing a change in the rotational drag force of an idler roller with the elapse of time for the present tape cartridge and a conventional tape cartridge.

In order to compare the change in the rotational torque of the idler roller in the data cartridge provided with the recess 40 with that in the rotational torque of the idler roller in the conventional data cartridge not provided with the recess 40, the changes in the rotational drag force of the idler roller with the elapse of time is measured. The result is shown in FIG. 7. As a method for measuring the rotational drag force, the driving belt 7 is mounted on only one idler roller 4, and the driving belt 7 is engaged on the output shaft of a driving motor to measure a load value which acted on the driving motor when the idler roller 4 is rotating. The obtained load value is set as the rotational drag force of the idler roller. A test apparatus having the above-described construction corresponding to the data cartridge, provided with the recess 40, according to this embodiment and a test apparatus having the above-described conventional construction of the data cartridge not provided with the recess 40 are preserved at 60° C. for 14 days, and then, the changes in the rotational torque of the idler roller is measured at the room temperature (about 25° C.). Grease applied to the idler roller used for the measurement contains base oil at 75–85 percent by weight, thickening agent at 5–15 percent by weight, and additive at 10–15 percent by weight. The grease having this composition is applied in an amount of $4 \times 10^{-6}$ liters to each inner peripheral surface of the through-hole of the idler rollers 4 of each test apparatus corresponding to the embodiment and that corresponding to the conventional art.

As shown in FIG. 7, after 14 days, in the test apparatus corresponding to the conventional art, the rotational drag force of the idler roller 4 drops by 22% with respect to an initial value, whereas after 14 days, in the test apparatus corresponding to the embodiment, the rotational drag force of the idler roller 4 drops by only 10% with respect to the initial value.

It is confirmed that the recess 40 prevents the base oil separated from the excess grease 75 from mixing with the grease 74 present in the clearance 72 between the idler roller 4 and the pivot pin 30. Thus, it is confirmed that the recess 40 has effect of preventing the tension of the magnetic tape 10 from being reduced much because the reduction in the rotational torque of the idler roller 4 is small.

The change in the tension of the magnetic tape 10 is measured by using a data cartridge which is based on the data cartridge, production number of which is "DC6525" available from Minnesota Mining and Manufacturing Company of St. Paul, Minn., in which the recess 40 is formed on both the pivot pins 30 and 31. As a comparison example, the same data cartridge without the recess 40 is used. The result is shown in Table 1. In a measurement, the tape is traveled in a forward direction from the supply side reel toward the winding side reel. After the data cartridge is preserved at 60° C., the change in the tension of the magnetic tape 10 is measured at the room temperature (about 25° C.). In the measurement, as a driving device, the travel system of "data cartridge drive" manufactured by "3M" Company is used, and instead of "magnetic head," a device on which a dynamic sensor for measuring the variation in tape tension has been installed is used. The travel speed of the tape is 90 inches per second (about 228.6 cm/second).

TABLE 1

|  | Initial value | After 3 days | After 14 days |
| --- | --- | --- | --- |
| Preferred Embodiment | 0.527N (53.7 gf) | 0.499N (50.9 gf) | 0.445N (51.0 gf) |
| Comparison example | 0.527N (53.7 gf) | 0.444N (45.5 gf) | 0.347N (35.4 gf) |

As apparent from Table 1, in the case of the data cartridge provided with the recess 40 corresponding to the embodiment, the tension of the magnetic tape is hardly changed after 14 days elapsed, whereas in the conventional data cartridge not provided with the recess 40, the tape tension drops to as great as about 65% of an initial value. The test result indicates that the recess has effect of keeping the tension of the magnetic tape 10 almost constant, irrespective of the length of an elapsed time period.

All patents and patent applications referred to above are hereby incorporated by reference.

In the above-described embodiment, the case in which the recess 40 is formed on the pivot pins 30 and 31 is exemplified because the change in the rotational torque of the idler roller can be reduced more effectively, but it is possible to form the recess 40 on the pivot pin 30 or 31. In the above-described embodiment, the data cartridge having a production number of "DC6525" is exemplified, but the present invention is applicable to other data cartridges, for example, "DC2120" or the like.

What is claimed is:

1. A tape cartridge having a supply-side tape reel around which a tape is wound and a winding-side tape reel both rotatably mounted to a base, at least one pin having a first end attached to the base and a second end, at least one roller having a through-hole rotatably engaged with the pin, and grease interposed between the at least one pin and the through-hole, the at least one pin including a recess formed proximate the second end opening in an axial direction of the pin, the recess having a volume greater than a volume of excess grease accumulated on an end portion of the pin during mounting of the roller on the pin.

2. The tape cartridge of claim 1 wherein the at least one roller comprises a drive roller for driving the supply-side tape reel and the winding-side tape reel while a driving belt travels in contact with the tape.

3. The tape cartridge of claim 2 wherein the at least one roller comprises a pair of idler rollers for a drive belt for a belt-driven tape cartridge.

4. The tape cartridge of claim 1 wherein the volume of the recess is at least one microliter.

5. The tape cartridge of claim 1 wherein the recess comprises an inclined surface extending from a peripheral surface at the second end of the pin.

6. The tape cartridge of claim 1 wherein the recess has a shape selected from a group consisting of conical, hemispherical, cylindrical, pyramidal, hexagonal, and prism-shaped.

7. The tape cartridge of claim 1 wherein the second end of the pin projects through the roller.

8. The tape cartridge of claim 1 wherein the grease comprises about 50 to 90 percent by weight base oil.

9. A belt-driven tape cartridge comprising:

a supply-side tape reel around which a tape is wound and a winding-side tape reel, both rotatably mounted to a base;

a plurality of pins each having a first end attached to the base and a second end having a recess opening in an axial direction of the pin;

a first roller having a through-hole rotatably engaged with a pin and grease interposed between the pin and the through-hole;

a second roller having a through-hole rotatably engaged with a pin and grease interposed between the pin and the through-hole; and a driving belt spanning a driving roller, the supply-side tape reel, the first roller, the second roller, and the winding-side tape reel sequentially, such that the driving belt passes on a surface of the supply-side tape reel and a surface of the winding-side tape reel, opposed to the surface of the supply side tape reel, such that the recesses have a volume greater than a volume of excess grease accumulated on an end portion of the pins during mounting of the rollers.

10. A system for rotatably mounting a roller to a base of a tape cartridge, the system comprising:

at least one pin having a first end attached to the base and a second end having a recess opening in an axial direction of the pin; and at least one roller having a through-hole rotatably engaged with the pin and grease interposed between the pin and the through-hole such that the recess has a volume greater than a volume of excess grease accumulated on an end portion of the pin during mounting the roller on the pin.

11. The system of claim 10 wherein the roller comprises an idler roller for a drive belt of a belt-drive tape cartridge.

12. The system of claim 10 wherein the roller comprises a drive roller for a belt-drive tape cartridge.

13. The system of claim 10 wherein the roller comprises a tape reel.

14. A method for manufacturing a tape cartridge, comprising the steps of:

providing a tape cartridge base having at least one pin, the at least one pin having a first end mounted to the base and a second end;

forming a recess in the second end of the pin that opens in an axial direction of the pin;

providing a roller having an axially extending through-hole formed therein;

applying grease to an interface between the through-hole of the roller and the pin; and inserting the pin into the through-hole of the roller to which the grease has been applied, such that the recess has a volume greater than a volume of excess grease accumulated on an end portion of the pin during mounting a roller.

15. The method of claim 14 wherein the step of applying grease comprises applying grease to an inner peripheral surface of the through-hole.

16. The method of claim 14 wherein the step of applying grease comprises applying grease to the pin.

* * * * *